Patented June 27, 1933

1,915,871

UNITED STATES PATENT OFFICE

CECIL SHAW, OF GRANGEMOUTH, AND JOHN THOMAS, OF POLMONT, SCOTLAND, ASSIGNORS TO IMPERIAL CHEMICAL INDUSTRIES LIMITED, A CORPORATION OF GREAT BRITAIN

PRODUCTION OF DYESTUFFS OF THE ANTHRAQUINONE SERIES

No Drawing. Application filed March 13, 1931, Serial No. 522,524, and in Great Britain March 14, 1930.

This invention relates to the manufacture of dyestuffs and intermediates; and it comprises a process of preparing nitro compounds wherein intermediates or dyestuffs of the anthracene series are treated with a nitrating agent in the presence of molten phthalic anhydride, the phthalic anhydride being subsequently separated by extraction if desired, and in which, in some instances, the reaction mixture may be given a further heat treatment prior to separation of the phthalic anhydride to produce gray and black dyes; and it also comprises the dyestuffs and intermediates so produced, particularly the vat dyestuffs which are capable of dyeing cotton in gray and black shades.

We have found that by treating dyestuffs and intermediates of the anthracene series with nitric acid in the presence of molten phthalic anhydride, it is possible to convert such compounds into nitro compounds without affecting the phthalic anhydride. This process is particularly advantageous with nitro-dibenzanthrone and like compounds, as nitro-dibenzanthrone may be converted into valuable dyestuffs by a suitable treatment of that compound in the presence of phthalic anhydride. The present invention makes it possible to combine the nitration of the dibenzanthrone with the subsequent treatment of the resulting nitro-benzanthrone into a one step process leading to the production of valuable dyestuffs.

In the present process phthalic anhydride is heated until it becomes molten and then the anthracene compound is added and the mixture heated until a uniform homogeneous mixture is obtained. Then the nitrating agent is slowly added with stirring and the heating continued until the nitration is substantially complete. The reaction mixture may be cooled and the cooled mass extracted with a suitable solvent to remove the phthalic anhydride. The nitro compounds thus produced are valuable as dyestuffs or intermediates.

In our process, if desired, the reaction mixture prior to a separation of the phthalic anhydride may be further heated to somewhat higher temperature to produce somewhat modified products. By this procedure there are produced vat dyestuffs which are capable of dyeing cotton from gray to black shades.

In our process the nitrating agent may be nitric acid of high concentration, for example, 97 per cent nitric acid.

Our present process is an advantageous method of preparing nitro derivatives of dyestuffs and intermediates of the anthracene series. Some of these nitro derivatives are themselves dyestuffs and may be immediately used in dyeing processes. Other of our nitro derivatives are intermediates and may be converted into dyestuffs by subsequent treatment.

In our process, molten phthalic anhydride is a very convenient liquid in which to effect the treatment with the nitrating agent. It is easily removed from the final products especially when they are insoluble in water. Further, the phthalic anhydride may be easily recovered in a pure condition, either as phthalic anhydride itself or in the form of phthalic acid.

The invention is illustrated, but not limited by the following examples, in which parts are by weight.

Example 1

10 parts of dibenzanthrone are added to 100 parts of molten phthalic anhydride and the mixture heated to 220° C. to ensure good mixing. The temperature is then allowed to fall somewhat so that the mass just remains liquid, and at this temperature 6 parts of 97% nitric acid are added drop by drop with constant stirring; and when all is in, the stirring can be continued for a further 2 hours at this temperature.

The mass is then poured into boiling water, filtered, the residue re-extracted with water, and when all the phthalic acid has been removed the product is dried. It consists essentially of nitrodibenzanthrone mixed with a little dibenzanthrone.

Example 2

This is carried out in a similar manner to Example 1, except that heating is continued for a few hours longer using a higher temperature, namely about 250° C., until no further change in shade is observed on isolating a portion and dyeing it on cotton. The whole is isolated as described in Example 1 and the product forms a dark powder, dyeing cotton in grey to black shades from an alkaline hydrosulphite vat.

*Example 3*

15 parts of dibenzanthrone are added to 80 parts of molten phthalic anhydride at 150° C. and a mixture of 10 parts of 94% nitric acid and 10 parts of phthalic anhydride run in steadily and heating continued for a further two hours at 150° C. At the end of this time the temperature is raised to 230° C. in about one hour and then further to 250° C. in another four hours. The melt is then allowed to partially cool with acid as in Example 1.

The product is a black paste which can be used immediately for dyeing, giving fast blue black shades. The exact shade of black obtained can be controlled by varying the quantity of nitric acid used and with larger quantities than those given above greener shades are obtainable.

*Example 4*

100 parts of Bzl:Bzl'-dibenzanthronyl are added to 500 parts of molten phthalic anhydride at 150° C. and then a mixture of 200 parts of 94% nitric acid and 400 parts of phthalic anhydride slowly run in. The temperature of 150° C. is maintained for another 2 hours and then the product isolated as in previous examples.

On drying the product is an orange coloured powder dissolving in sulphuric acid with a red colour and apparently a dinitro-derivative.

*Example 5*

10 parts of anthraquinone-1.2-naphthacridone are added to 50 parts of phthalic anhydride at 140° C. and a mixture of 20 parts of 94% nitric acid with 20 parts of phthalic anhydride slowly added. The temperature of 140° C. is maintained for another hour and the product then isolated in the usual manner. After drying it is an orange coloured powder which is substantially dinitro-anthraquinone-1.2-naphthacridone.

*Example 6*

50 parts of dibenzpyrenequinone are added to 500 parts of molten phthalic anhydride at 160° C. and a mixture of 50 parts 94% nitric acid and 50 parts phthalic anhydride run in at a temperature of 130–140° C. during ½ hour.

The mixture is then kept at that temperature for a further half hour. It is then poured out, allowed to cool, ground and extracted with water until free from phthalic acid.

The product is an orange powder and consists substantially of the dinitro derivative.

It dissolves in D.O.V. to give a blood red solution and vats in alkalin hydrosulphite to give a red brown solution, which dyes cotton in yellow shades.

*Example 7*

1,000 parts of phthalic anhydride are melted at 160° C. and 100 parts of anthanthrone added at that temperature. A mixture of 90 parts of 92% nitric acid and 120 parts of phthalic anhydride is then run in at a temperature of 160° C. during quarter of an hour and the melt then kept between 160–165° for ½ hour.

The mixture is then poured out, allowed to cool, ground, and extracted and washed with water. The resulting product on drying dissolves in sulphuric acid to a dark violet solution and vats in alkaline hydrosulphite to a bluish red solution which dyes cotton in greyish shades of blue.

*General*

Molten phthalic anhydride forms a very convenient liquid for carrying out the process described. It is easily removed from the final products, especially when these are insoluble in water, and at the same time, the phthalic anhydride itself is easily recoverable in pure form, either as phthalic acid or phthalic anhydride.

As many apparently widely different embodiments of this invention may be made without departing from the spirit and scope thereof, it is to be understood that we do not limit ourselves to the foregoing examples or description, except as indicated in the following patent claims.

We claim:

1. A process for the manufacture of nitro-compounds which comprises the treatment of intermediates or dyestuffs of the anthracene series with a nitrating agent in the presence of molten phthalic anhydride.

2. A process according to claim 1 in which the nitrating agent is high-strength nitric acid.

3. A process according to claim 1 followed by recovery of the phthalic anhydride.

4. A process for the nitration of a dibenzanthrone body which comprises the treatment of the dibenzanthrone body with nitric acid in presence of molten phthalic anhydride.

5. A process for the nitration of dibenzpyrenequinone which comprises the treatment of dibenzpyrenequinone with nitric acid in presence of molten phthalic anhydride.

6. A process for the nitration of anthraquinone-1:2-naphthacridone which comprises the treatment of that compound with nitric acid in presence of molten phthalic anhydride.

7. A process according to claim 4 followed, without isolation of the nitro-compound, by a heat-treatment at a higher temperature for the production of gray to black vat dyes.

8. As a new composition of matter the vat dye of unknown constitution which can be produced by nitrating dibenzanthrone in molten phthalic anhydride at about 150° and then heating the melt at about 230–250°, the said vat dye being a black powder giving fast blue-black shades on cotton from a hydrosulphite vat.

In testimony whereof we affix our signatures.

CECIL SHAW.
JOHN THOMAS.